United States Patent [19]

Deguchi

[11] Patent Number: 5,793,619
[45] Date of Patent: Aug. 11, 1998

[54] ELECTRONIC APPLIANCE HOUSING HAVING STORAGE PORTION

[75] Inventor: Manabu Deguchi, Tokyo, Japan

[73] Assignee: NEC Corporation, Tokyo, Japan

[21] Appl. No.: 562,218

[22] Filed: Nov. 28, 1995

[30] Foreign Application Priority Data

Nov. 30, 1994 [JP] Japan ................. 6-319406

[51] Int. Cl.⁶ ............................. H05K 5/00
[52] U.S. Cl. ............ 361/814; 174/52.1; 292/99; 455/90
[58] Field of Search ............ 361/814; 174/52.1; 292/99, 198; 455/90

[56] References Cited

U.S. PATENT DOCUMENTS

| | | | |
|---|---|---|---|
| 5,307,511 | 4/1994 | Takahashi | 455/90 |
| 5,578,794 | 11/1996 | Lamb et al. | 174/52.1 |

FOREIGN PATENT DOCUMENTS 0 367 608   5/1990   European Pat. Off. .

*Primary Examiner*—Bot L. Ledynh
*Assistant Examiner*—Jayprakash N. Gandhi
*Attorney, Agent, or Firm*—Young & Thompson

[57] ABSTRACT

An electronic appliance housing is arranged by a cover with a locking groove, an operation portion with a locking portion fitted to this locking groove, and a housing to which the cover is attached. This cover is slidably mounted on the housing. Both the locking groove of the cover and a locking portion have portions inclined with respect to the cover, for instance, such a portion whose sectional shape is a parallelogram. The operation portion has a portion slid along a direction perpendicular to the sliding direction of the cover. With this sliding portion, the locking portion is slidably entered/derived into/from the locking groove. When the locking portion is fitted into the locking groove such that the cover is mounted on the housing, the cover is fixed so as not to be dropped out. The operation portion is attached to a portion of the housing, and has such a structure that this operation portion is moved downwardly by depressing the housing from the upper direction. When the cover is mounted on the housing and the operation portion is depressed downwardly under locking state by the operation portion, the locking portion fitted to the locking groove of the cover is also moved downwardly. At this time, a wedge effect is produced by abut force exerted between the locking portion and an inclined edge located opposite to the locking groove. The cover is slid along the removing direction in response to force produced by this wedge effect.

15 Claims, 4 Drawing Sheets

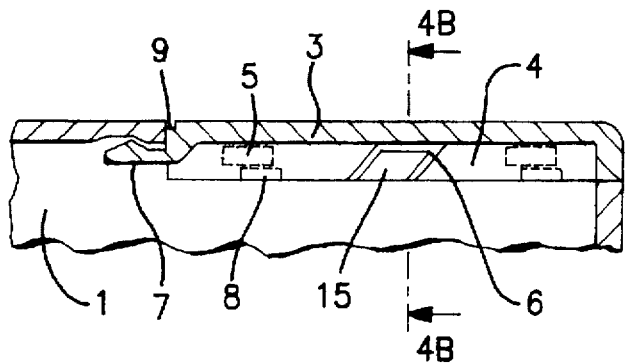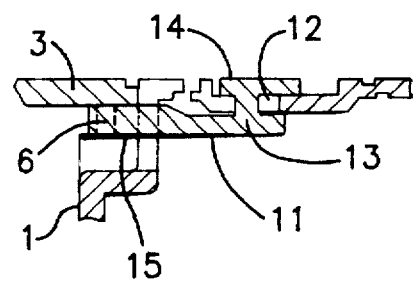
FIG. 4A  FIG. 4B
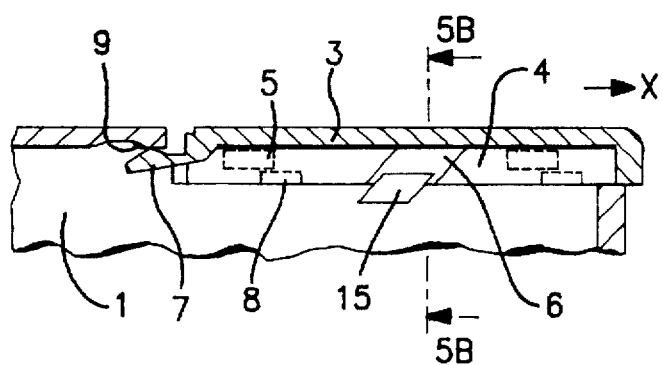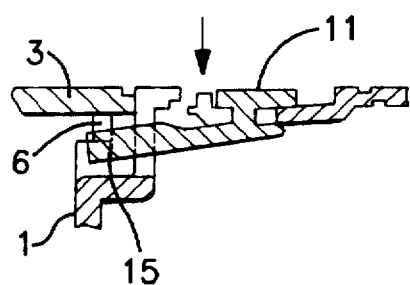
FIG. 5A  FIG. 5B

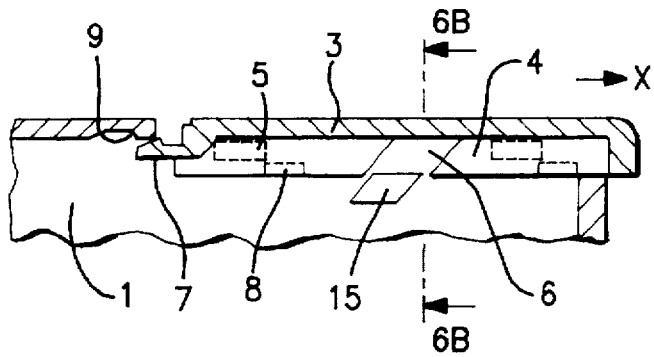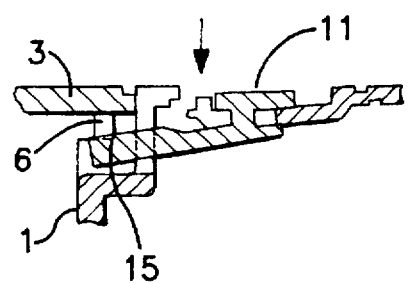
FIG. 6A  FIG. 6B
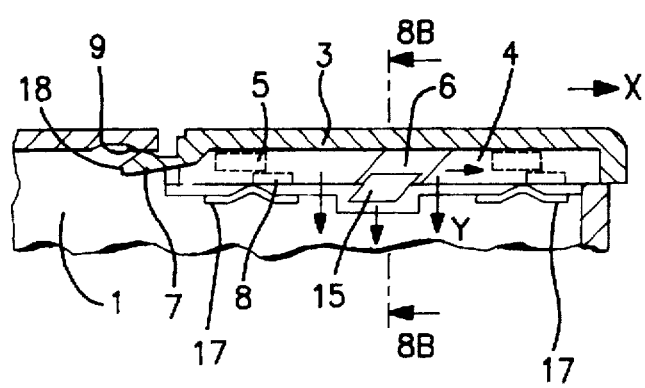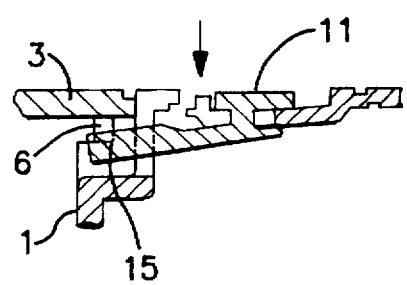
FIG. 8A  FIG. 8B

ELECTRONIC APPLIANCE HOUSING HAVING STORAGE PORTION

BACKGROUND OF THE INVENTION

1. FIELD OF THE INVENTION

The present invention generally relates to a structure of a housing of an electronic appliance. More specifically, the present invention is directed to a detachable structure of a cover used to close a storage portion of a housing for storing an electronic part such as a battery.

2. DESCRIPTION OF THE RELATED ART

In portable telephones, radio paging receivers and other electronic appliances, portions for storing batteries or cells are formed in housings. In a battery storage portion, batteries are mounted, and an opening of this battery storage portion is covered by a cover.

When the battery is taken out from the housing, the cover is removed from the housing, and the cover is attached after being mounted. Since a battery is replaced at a certain frequency, it is required that the cover can be simply detached to the housing. Under such a condition that the cover is attached, normally, a locking mechanism is provided in order that the cover is not dropped from the housing. The locking mechanism is constructed of, for example, a locking groove provided at the housing side, and a locking piece fitted into this locking groove and mounted on the cover. For instance, Japanese Laid-open Patent No. Hei 1-260757 discloses the technique for preventing the cover from being dropped by employing such a locking piece.

However, since the component arranging space of the conventional housing structure is limited, it is rather difficult to define a sufficiently large space to arrange the locking piece therein. As a consequence, both of the locking portion and the operation portion thereof are necessarily made compact, so that operability of the locking piece would be deteriorated. Therefore, strong force could not be easily applied to the locking piece 31, so that the operations when the cover 23 is mounted and removed would become difficult.

Especially, when the locking condition is released from the condition under which the locking portion is fitted into the locking groove in order to remove the cover mounted on the opening, the locking piece cannot be smoothly slid along the locking release condition. This is because contact friction is produced between the locking piece and the locking groove.

Under condition that the cover is mounted on the housing, a space would be made between the locking piece and the locking groove, so that the cover cannot be sufficiently fixed. As a result, when the housing itself is vibrated, the cover would also be vibrated.

SUMMARY OF THE INVENTION

An object of the present invention is to provide an electronic appliance housing capable of simply detaching a cover mounted on a housing, especially easily releasing a locking condition, and capable of sufficiently fixing the cover when being mounted on the housing.

An electronic appliance housing, according to the present invention, is constructed of a cover with a locking groove, and operation portion with a locking portion fitted to this locking groove, and a housing with a portion to which both of the operation portion and a cover mounting portion to which the cover is attached. This cover is slidably mounted on the housing. Both the locking groove of the cover and a locking portion have portions inclined with respect to the cover in this structure. The operation portion has a portion slid along a direction perpendicular to the sliding direction of the cover. With this sliding portion, the locking portion is slidably entered/derived into/from the locking groove. When the locking portion is fitted into the locking groove under such a condition that the cover is mounted on the housing, the cover is fixed so as not to be dropped out. As sectional shapes of the above-explained locking groove and locking portion, parallelogram shapes may be employed.

Furthermore, the operation portion has a structure that this operation portion is moved downwardly in response to the depression of the housing applied from the upper direction. The operation portion is mounted on a portion of the housing, the mounting portion of the housing is elastically deformed, so that this operation portion can be moved downwardly. When the operation portion is depressed downwardly, the locking portion fitted to the locking groove of the cover is also moved to the lower position. It should be noted that since either a leaf spring or a coil spring is arranged between the operation portion and the housing, the operation portion may be moved downwardly by depression.

When the locking piece under locking state is moved downwardly by depressing the operation portion, a wedge effect is produced by abut force exerted between the locking portion and an inclined edge located opposite to the locking groove. The cover is slid along the removing direction in response to the force produced by this wedge effect. As a consequence, when the cover is removed, the cover can be simply taken out from the housing without sliding operation of the locking piece. Therefore, even when the locking piece is made compact, operability thereof would not be deteriorated.

Moreover, according to the electronic appliance housing of the present invention, in the above-described structure, an engaging piece and an engaging projection portion are provided on each of the cover and the housing mount portion in order that the cover is not removed from the housing. An engaging piece is formed at a tip portion of the cover along the sliding direction, and is fitted with the engaging hole formed in the housing under such a condition that the cover is completely mounted on the housing. The engaging piece of the cover has a pawl. Under fitting condition, the pawl enters into the housing from the projection portion of the engaging hole at the housing side, and thus the cover is not removed, or dropped from the housing.

A spring portion may be provided at a bottom on which the cover of the housing is slid in such a manner that the cover is depressed upwardly. With employment of such a structure, the engaging piece of the cover is depressed against the engaging projection portion of the housing under such a condition that the cover is mounted on the housing. As a consequence, even when vibrations are externally applied, the cover is not be vibrated.

On the other hand, when the cover is removed by the operation portion, the cover is also depressed downwardly if the operation portion is depressed along the lower direction, so that the pawl is automatically released from the projection portion of the engaging hole. Therefore, the pawl may be released from the housing and the cover may be slid along the removing direction by depressing the operation portion downwardly.

BRIEF DESCRIPTION OF THE DRAWINGS

The above and other objects, features and advantages of the present invention will become more apparent from the following detailed description when taken in conjunction with the accompanying drawings wherein:

FIG. 4a is a cross-sectional view for showing a locking condition of a locking piece employed in the housing of FIG. 2, and FIG. 4b is a sectional view thereof, taken along a line A—A of FIG. 4a;

FIG. 5a is a cross-sectional view for indicating a locking release operation by the locking piece, and FIG. 5b is a sectional view for showing the locking release operation, taken along a line B—B of FIG. 5a;

FIG. 6a is a cross-sectional view for showing a condition of completion of the locking release condition by the locking piece, and FIG. 6b is a sectional view thereof, taken along line C—C of FIG. 6a;

FIG. 8 is a cross-sectional view for indicating a condition of completion of a locking release operation by a locking piece employed in the electronic appliance housing of FIG. 7.

DETAILED DESCRIPTION OF THE PREFERRED EMBODIMENTS

Before describing a structure of an electronic appliance housing according to the present invention, the structure of the conventional electronic appliance housing will now be explained for a better understanding of the present inventive idea.

Figure 1:
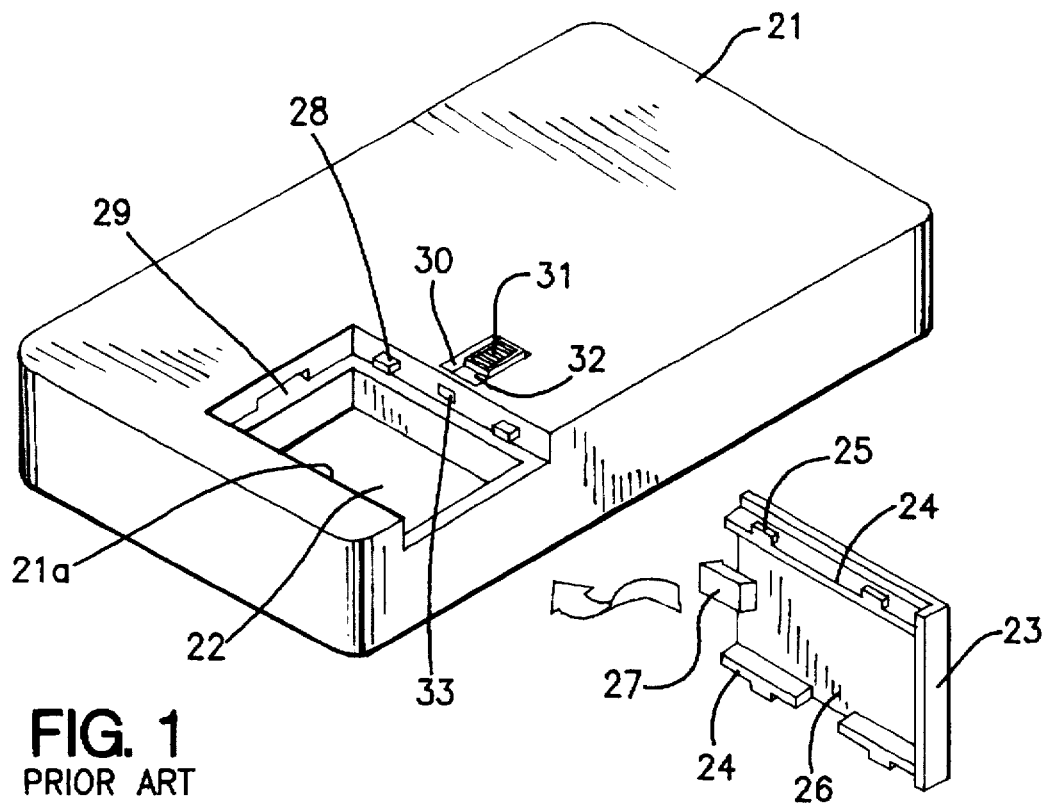
FIG. 1 is a perspective view for showing the conventional housing from which the cover is removed.

FIG. 1 schematically shows a structure of an electronic appliance housing containing a conventional locking mechanism. In this prior art, a radio paging receiver is employed as an example. In FIG. 1, a rectangular opening 21a is formed in a rear surface of a housing 21 of this radio paging receiver. As viewed into this opening 21a, a battery storage chamber 22 is defined within the housing 21.

A cover 23 used to close this opening 21a is formed in a rectangular shape whose one edge portion is bent, and a rib 24 is formed in a standing condition along both edge portions thereof. Engage pieces 25 are fabricated on the ribs 24, which project toward both sides. A locking groove 26 is formed in a portion of the engage pieces 25. Further, another engage piece 27 whose tip portion is wedge-shaped is formed on the other edge portion of the cover 23.

Also, an engage projection portion 28 engaged with the engage piece 25 of the cover 23 is provided at both sides of the opening 21a of the housing 21. An engage hole 29 is made in an edge surface of the opening 21a, and this opening 21a is covered by the above-described cover 23. Since the cover 23 is slightly slid along the longitudinal direction thereof, the engage piece 25 is engaged with the engage projection portion 28. The engage piece 27 is engaged with the engage hole 29. With this engagement, the cover 23 is held by the housing 21. A slide groove 30 is formed in one side of the opening toward a direction perpendicular to this side surface. Within this slide groove 30, a locking piece 31 is installed which can be slid along the same direction as the above-described direction.

This locking piece 31 is operable with an operation portion 32 exposed toward the outer surface of the housing by manually manipulating. When the locking piece 31 is slid toward the opening, a locking portion 33 of the tip portion thereof is inserted into the above-described locking groove 26 of the cover 28. Thus, it is protected that the cover 23 is removed from the housing 21. Accordingly, when the locking piece 31 is manually manipulated along the reverse direction, the locking portion 33 can be evacuated from the locking groove 26. As a result, the cover 23 is removed from the housing 21 to thereby open the opening 21a, so that the battery may be set and removed.

Normally, since a compact electronic appliance is required, it is rather difficult to define a sufficiently large space to arrange the locking piece 31 therein. As a consequence, since locking piece 31 and operation portion 32 become small, operability of the locking piece 31 would be deteriorated, and also strong force could not be easily applied to the locking piece 31. Thus, the operations when the cover 23 is mounted and removed would become difficult.

Especially, in the conventional structure, when the locking condition is released from the condition under which the locking portion 33 is fitted into the locking groove 26 in order to remove the cover 23 mounted on the opening 21a, the locking piece 31 cannot be smoothly slid along the locking release condition. This is because the large slide force of the locking piece 31 is maintained due to contact friction occurred between the locking portion 33 and the locking groove 26.

Figure 2:
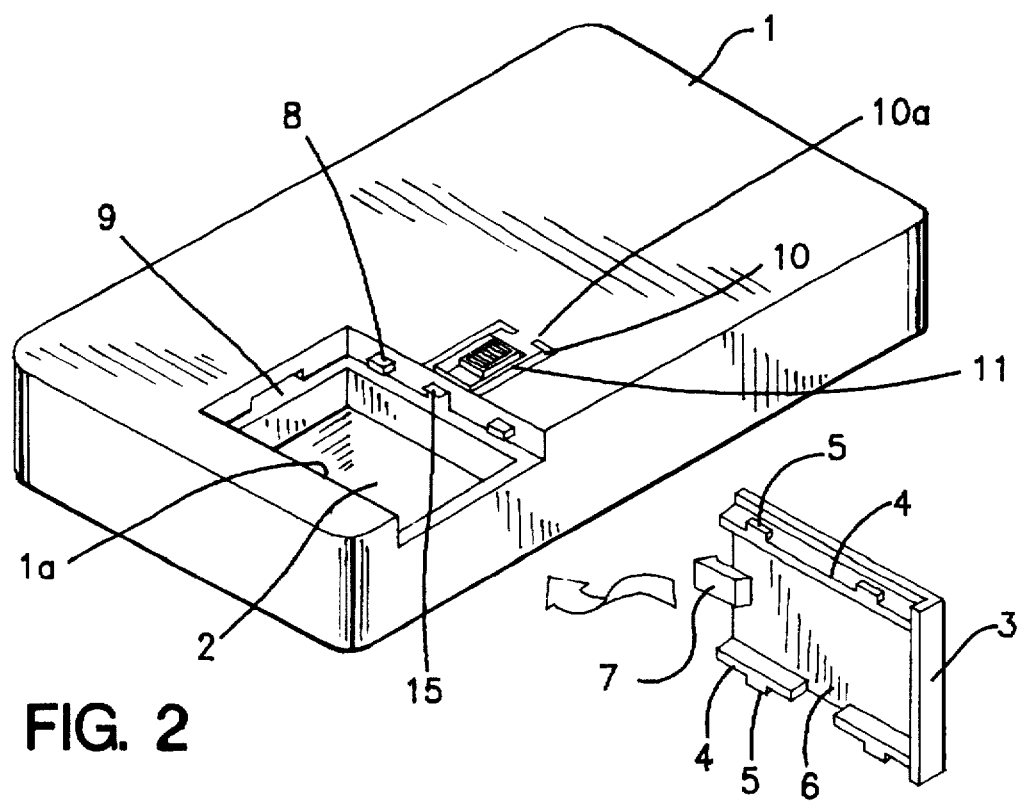
FIG. 2 is a perspective view for indicating an electronic appliance housing from which a cover is removed, according to an embodiment of the present invention.

Referring now to drawings, an electronic appliance housing according to an embodiment of the present invention will be explained. FIG. 2 is a perspective view for indicating such a condition that a cover is removed from the electronic appliance housing according to one embodiment of the present invention. Also, a radio paging receiver is employed as an example of this electronic appliance in this embodiment.

In FIG. 2, a rectangular opening 1a is formed in a rear surface of a housing 1 of this radio paging receiver. As viewed into this opening 1a, a battery storage chamber 2 is defined within the housing 1. A cover 3 used to close this opening 1a is formed in a rectangular shape whose one edge portion is bent, and a rib 4 is formed in a standing condition along both edge portions thereof. Engage pieces 5 are fabricated on the ribs 4 which project toward both sides. A locking groove 6 is formed in a portion of the engage pieces 5. Further, another engage piece 7 whose tip portion is wedge-shaped is formed on the other edge portion of the cover 3. The locking groove 6 is made of a notch having a shape of a parallelogram (will be discussed later).

Also, an engage projection portion 8 engaged with the engage piece 5 of the cover 3 is provided at both sides of the opening 1a of the housing 1. An engage hole 9 is made in an edge surface of the opening 1a.

When the cover 3 is mounted, the opening 1a is covered by this cover 3 and then the cover 3 is slightly slid along the longitudinal direction of this cover 3. As a result, the engage piece 5 is engaged with the engage projection portion 8, and the engage piece 7 is engaged with the engage hole 9. With these engagements, the cover 3 is held by the housing 1. A slide portion 10 constructed of a rectangular concave portion is formed in one side of the opening 1a along a direction perpendicular to this side surface. A locking piece 11 is slidably provided within this slide portion 10 along the same direction as the above-described direction.

Figure 3:
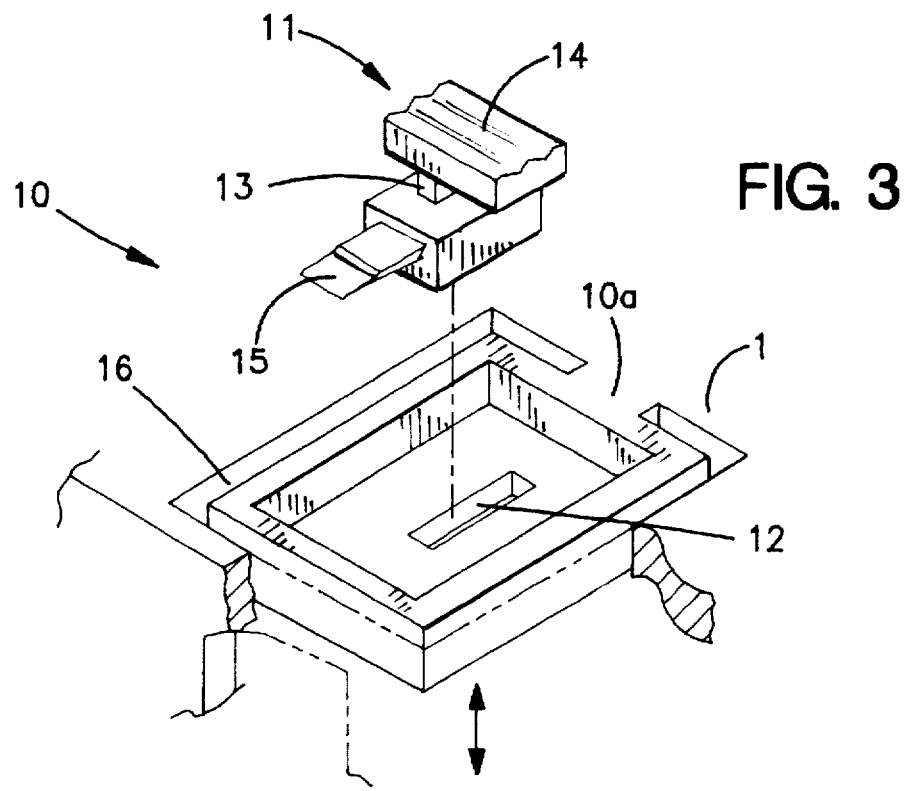
FIG. 3 is a fragmentary perspective view for representing a detailed structure of a slide portion of the electronic appliance housing shown in FIG. 2.

FIG. 3 is a fragmentary perspective view for showing a detailed structure of the slide portion 10, a portion of which is broken. A slit 12 is opened along the slide direction in a bottom surface of the slide portion 10 formed in the housing 1. The locking piece 11 is arranged by a small piece portion 13 penetrated through this slit 12, an operation portion 14 integrally formed on the upper portion thereof, and a locking portion 15 integrally formed on the lower portion thereof. Then, a sectional shape of the locking portion 15 is made as a parallelogram corresponding to the above-described locking groove 6. It should be understood that although the parallelogram-shaped portion is formed as a complete notch groove in this embodiment, this parallelogram-shaped portion may partially have a groove if an inclined portion is provided.

In this example, the slide portion 10 formed in the housing 1 owns a notch slit 16 formed along both sides of this slide portion 10. Since this notch slit 16 is formed, the slide portion 10 is supported at one edge portion 10a with respect to the housing 1. While this supported edge portion 10a is used as a fulcrum, elastic deformation can be achieved along the thickness direction of the housing 1, namely, the upper/lower direction of FIG. 3.

As a consequence, in accordance with this structure, when the cover 3 is mounted on the opening 1a of the housing 1, the locking piece 11 is slid from the opening 1a to the evacuated position in a similar manner to the conventional structure. Then, while the cover 3 is slid with respect to the opening 1a by utilizing the rib 4 of this cover 3, the cover 3 is inserted. As a result, as illustrated in Figs.4a and 4b, the engaging piece 5 is engaged with the engaging projection portion 8, and also the engaging piece 7 is engaged with the engaging hole 9. Under this condition, since the locking piece 11 is slid toward the opening 1a, the locking portion 15 is fitted into the locking groove 6, and the cover 3 is brought into the fixed condition with respect to the housing 1, so that it is possible to avoid that the cover 3 is dropped from the opening 1a.

On the other hand, when the cover 3 is removed from the opening 1a, the locking piece 11 is moved in such a direction along which this locking piece 11 is moved back from the opening 1a, so that the locking portion 15 is evacuated from the locking groove 6. Thus, the cover 3 can be drawn from the opening 1a so as to be removed therefrom even by performing a similar operation to the conventional manner.

In accordance with the electronic appliance housing of the present invention, the locking condition may be released by depressing the locking piece 11 downwardly under condition that the locking portion 15 is fitted into the locking groove 6 in addition to the above-described operation. As shown in a cross-sectional view of FIG. 5a and a sectional view of FIG. 5b, taken along a line B—B of FIG. 5a, when the locking piece 11 is depressed downwardly, the slide portion 10 for supporting the locking piece 11 is elastically deformed downwardly while one edge portion 10a thereof is used as a fulcrum. At this time, since both of the slide portion 10 and the locking piece 11 are elastically deformed downwardly in an integral form, the inclined edge portions of the locking portion 15 and the locking groove 6, which parallelogram-shaped, are brought into abutting conditions. In response to wedge force exerted by the wedge effects of the inclined edge portions, the rib 4 in which the locking groove 6 is formed, namely the cover 3 is push out along an X direction (see FIG. 5a). Thus the cover 3 is moved along the removing direction by way of this operation. First, the engage piece 7 is released from the engaging condition established with the engaging hole 9.

Furthermore, when the locking piece 11 is depressed downwardly, as shown in a cross-sectional view of FIG. 6a and a sectional view of FIG. 6b, taken along a line C—C of FIG. 6a, the cover 3 is transported along an X direction as indicated by an arrow by a length equivalent to the length of the inclined edge thereof. The engaging condition between the engaging piece 5 and the engaging projection portion 8 is also released. Under this condition, the locking portion 15 is completely removed from the locking groove 6. When the cover 3 is drawn under this condition, the cover 3 can be simply removed from the housing 1.

As a consequence, in this structure, both of the locking piece 11 and the operation portion 14 can be made compact because of the arranging space relationship in the housing 1. Even when this operability is lowered, no longer the sliding operation of the locking piece 11 when the locking condition is released is required, in which the operation was difficult. Moreover, the locking condition can be released only by merely depressing the locking piece 11, resulting in very easy operation.

Figure 7:
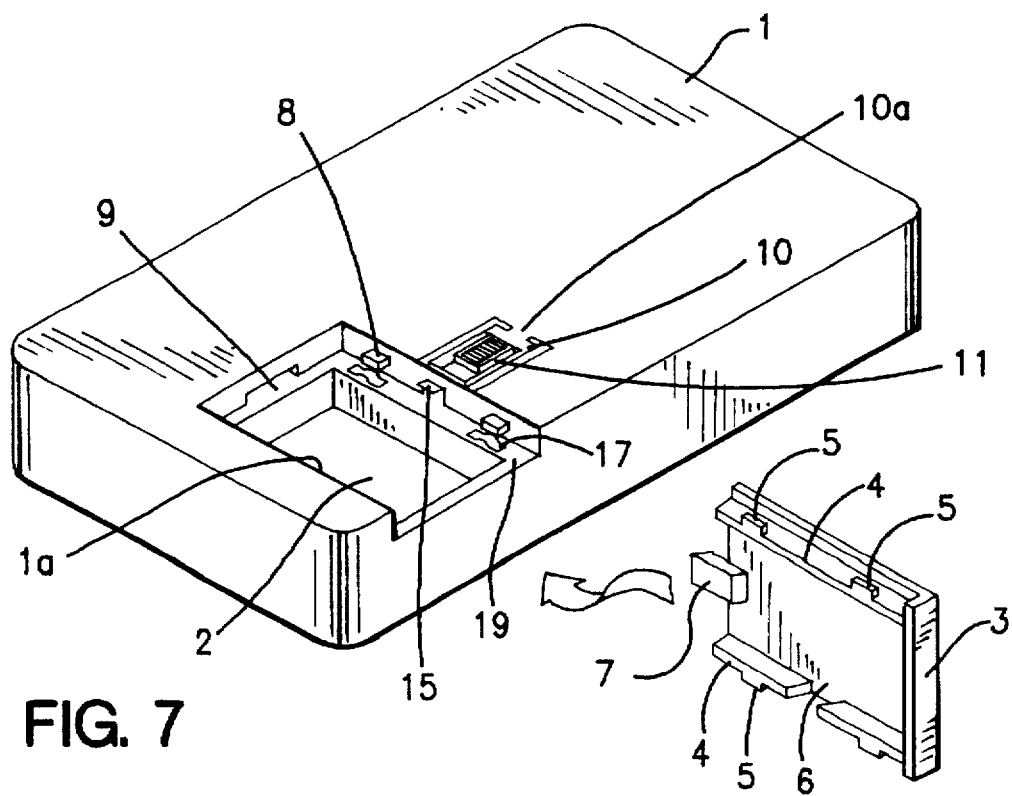
FIG. 7 is a perspective view for representing an electronic appliance housing from which a cover is removed, according to another embodiment of the present invention.

Next, an electronic appliance housing according to another embodiment of the present invention will now be explained with reference to FIGS. 7 and 8. FIG. 7 is a perspective view for showing such a condition that a cover is removed in the electronic appliance housing according to another embodiment of the present invention. FIG. 8a is a cross-sectional view for representing such a condition that a lock releasing operation by a locking piece is accomplished, and FIG. 8b is a sectional view thereof, taken along a line C—C of FIG. 8a.

A structure shown in FIG. 7 is substantially identical to the above-explained structure indicated in FIG. 2. As to a different point between them, in the structure shown in FIG. 7, a spring-17 used to push up a cover upwardly is provided in a bottom portion 19 of a housing of a portion to which the cover is mounted. In this case, as one example of the spring 17, there is shown a leaf spring embedded in the bottom of the housing.

When the cover 3 is mounted on the housing 1 by the sliding operation, the spring 17 is depressed downwardly. Once the cover 3 is mounted on the housing 1, a pawl 18 of the engaging piece 7 of the cover 3 enters into the engaging hole 9 of the housing 1, so that the cover 3 is not removed. Since the cover 3 is pushed up by the spring 17 upwardly, the upper surface of the engaging piece 5 of the cover 3 is strongly made in contact with the lower surface of the engaging projection portion 8 of the housing 1. With this contact, even when the housing 1 is vibrated, there is no possibility that the cover 3 would be vibrated.

On the other hand, when the cover 3 is taken out by the depression of the operation portion 14, as illustrated in FIG. 8a, the cover 3 is similarly depressed along a direction indicated by an arrow Y. Consequently, the pawl 18 of the engaging piece 7 is automatically released from the engaging hole 9 of the housing 1. Then, as described above, the force is exerted on the cover 3 along the removing direction, so that the cover 3 is slid to be taken out from the housing 1.

According to the electronic appliance housing of the present invention, since the spring is employed so as to push up the cover to the housing side, the cover is not easily removed from the housing, but also is not swung even under vibrations. Even if such a structure is employed, the cover can be very simply released from the housing by depressing the operation portion.

The above-described embodiments are such an example that the present invention has been applied to the radio paging receivers. However, the present invention is not limited to these embodiments, but may be similarly applied to a portable transceiver, and other electronic appliances. Also, in these embodiments, the present invention is applied to the battery covers. Alternatively, the present invention may be similarly applied to such a cover structure for closing an opening which is used to store an attachment part into a housing.

As previously described, according to the present invention, the edge portions inclined along the cover sliding directions are formed in the locking portion formed on the locking piece for bringing the cover into the locking condition, and also the locking groove fitted into this locking portion. When the locking piece under locking state is depressed to be elastically deformed, force exerted from the wedge effects is produced by receiving the abutting force produced between the locking portion and the inclined portion opposite to the locking groove. As a consequence, the cover can be removed by being slid. Accordingly, when the cover is removed, no longer the locking piece is slid. Even when the locking piece is made compact, operability to detach the cover can be improved.

In particular, the locking piece is supported in such a manner that this locking piece can be slid on a portion of the housing, and this portion of the housing many be elastically deformed in combination with the locking piece along the plate thickness direction of the housing by way of the slit formed around this portion. As a result, the locking condition can be maintained while the locking piece is supported to the housing. On the other hand, the locking piece may be elastically deformed toward the inside of the housing.

When both of the locking piece and a portion of the housing are elastically deformed by a preselected amount, it is so constructed that the locking portion is released from the notch edge of the locking groove outside of this locking groove. Therefore, when the locking piece is elastically deformed by a preselected amount, the fitting condition between the locking portion and the locking groove is released without sliding the locking piece, so that the cover may be removed.

While this invention has been described in connection with certain preferred embodiments, it is to be understood that the subject matter encompassed by way of this invention is not to be limited to those specific embodiments. On the contrary, it is intended for the subject matter of the invention to include all alternative, modification and equivalents as can be included within the spirit and scope of the following claims.

What is claimed is:

1. An electronic appliance housing comprising:

a house having a storage portion; and a cover mounted on the storage portion of the housing, wherein said housing further includes:

cover sliding means for sliding said cover; and an operation portion equipped with a locking portion having an inclined portion with respect to a sliding direction of said cover slide portion, locking-portion sliding means for sliding said locking portion along a direction perpendicular to said sliding direction, and transporting means for transporting said locking portion downwardly;

said cover includes:

a locking groove having an inclined portion with respect to a sliding direction in said sliding portion and for fitting said locking portion.

2. An electronic appliance housing as claimed in claim 1, wherein a sectional shape of said inclined portion of said locking portion is a parallelogram.

3. An electronic appliance housing as claimed in claim 1, wherein said transporting means contains an elastic deform portion of a portion in said housing, to which said operation portion is mounted.

4. An electronic appliance housing as claimed in claim 3, wherein said housing further includes a slit between said portion to which said operation portion is mounted, and other portions.

5. An electronic appliance housing as claimed in claim 1, wherein said transporting means includes an elastic deform member arranged between said housing and said operation portion.

6. An electronic appliance housing as claimed in claim 5, wherein said elastic deform member is a leaf spring.

7. An electronic appliance housing as claimed in claim 5, wherein said elastic deform member is a coil spring.

8. An electronic appliance housing as claimed in claim 1, wherein said housing further includes:

a bottom portion; and an engaging projection portion provided above said bottom portion; and said cover further includes:

a slide engaging piece arranged between said bottom portion and said engaging projection portion under the mounting condition.

9. An electronic appliance housing as claimed in claim 8, wherein said cover further includes a connect engaging piece with a pawl at a tip portion thereof along said sliding direction; and said housing further includes an engaging hole fitted to said connect engaging piece.

10. An electronic appliance housing as claimed in claim 9, wherein said bottom portion includes pushing means for pushing said cover upwardly when said cover is mounted.

11. An electronic appliance housing as claimed in claim 9, wherein said pushing means is a leaf spring.

12. An electronic appliance housing as claimed in claim 1, wherein said storage portion contains a portion used to store therein a cell.

13. An electronic appliance housing as claimed in claim 1, wherein said storage portion contains a portion employed to store therein a battery.

14. A portable telephone comprising:

said electronic appliance housing as recited in claim 1.

15. A radio paging receiver comprising:

said electronic appliance housing as recited in claim 1.

* * * * *